United States Patent
Kunt et al.

(10) Patent No.: US 11,122,459 B2
(45) Date of Patent: Sep. 14, 2021

(54) METHOD AND APPARATUS FOR SKIPPING UPLINK TRANSMISSION IN MOBILE COMMUNICATIONS

(71) Applicant: MediaTek Singapore Pte. Ltd., Singapore (SG)

(72) Inventors: Mehmet Kunt, Cambridge (GB); Pradeep Jose, Cambridge (GB); Pavan Santhana Krishna Nuggehalli, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/834,197

(22) Filed: Mar. 30, 2020

(65) Prior Publication Data

US 2020/0229028 A1 Jul. 16, 2020

Related U.S. Application Data

(63) Continuation of application No. 16/018,006, filed on Jun. 25, 2018, now Pat. No. 10,645,610.

(60) Provisional application No. 62/590,411, filed on Nov. 24, 2017.

(51) Int. Cl.
*H04W 28/02* (2009.01)
*H04W 72/12* (2009.01)
*H04W 72/14* (2009.01)

(52) U.S. Cl.
CPC ... *H04W 28/0278* (2013.01); *H04W 72/1268* (2013.01); *H04W 72/14* (2013.01); *H04W 72/1284* (2013.01)

(58) Field of Classification Search
CPC ......... H04W 28/0278; H04W 72/1268; H04W 72/14; H04W 72/1284
See application file for complete search history.

(56) References Cited

U.S. PATENT DOCUMENTS

| | | | |
|---|---|---|---|
| 2018/0270026 A1* | 9/2018 | Lee | H04L 1/1887 |
| 2018/0317123 A1* | 11/2018 | Chen | H04W 72/1284 |
| 2019/0082450 A1* | 3/2019 | Ying | H04L 1/1822 |
| 2019/0245657 A1* | 8/2019 | Lee | H04L 1/1812 |

FOREIGN PATENT DOCUMENTS

EP 3226639 A1 10/2017

OTHER PUBLICATIONS

Indian Patent Office, Examination Report for Indian Patent Application No. 202027025881, dated Jun. 21, 2021.
Nokia et al., UL skipping with LCH restriction, 3GPP TSG-RAN WG2 #99bis, R2-1710819, Prague, Czech Republic, Oct. 9-13, 2017.

* cited by examiner

*Primary Examiner* — Duc C Ho
(74) *Attorney, Agent, or Firm* — Han IP PLLC; Andy M. Han

(57) ABSTRACT

Various solutions for skipping uplink transmission with respect to user equipment and network apparatus in mobile communications are described. An apparatus may determine whether a padding buffer status report (BSR) is included in a protocol data unit (PDU). The apparatus may skip transmission of the PDU when the padding BSR is included in the PDU. The PDU may comprise a medium access control (MAC) PDU. The MAC PDU may comprise no MAC service data unit (SDU).

18 Claims, 4 Drawing Sheets

METHOD AND APPARATUS FOR SKIPPING UPLINK TRANSMISSION IN MOBILE COMMUNICATIONS

CROSS REFERENCE TO RELATED PATENT APPLICATION(S)

The present disclosure is part of a continuation of U.S. patent application Ser. No. 16/018,006, filed on 25 Jun. 2018, claiming the priority benefit of U.S. Patent Application No. 62/590,411, filed on 24 Nov. 2017. Contents of aforementioned applications are incorporated by reference in their entirety.

TECHNICAL FIELD

The present disclosure is generally related to mobile communications and, more particularly, to uplink transmission skipping with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), the network side may configure two types of uplink grants for the user equipment (UE) to perform uplink transmissions. The uplink grant may indicate some specific radio resources (e.g., time and frequency resources) for the UE to perform uplink transmission. One type of the uplink grant may comprise the dynamic grant. The dynamic grant may be configured based on the UE's request. For example, the UE may transmit a prior request (e.g., service request (SR), random-access channel (RACH) request or buffer status report (BSR)) to the network. After receiving the request, the network may configure the dynamic grant according to UE's request for the UE to perform uplink data transmission.

The other type of the uplink grant may comprise the configured grant. The configured grant may be configured by the network without UE's request. For example, the uplink grant-free transmission or the semi-persistent scheduling (SPS) transmission is used to reduce the latency of ultra-reliable and low latency communications (URLLC) services. The UE may be configured to transmit its uplink data on the configured grant without transmitting a prior request to improve the transmission latency. The network may pre-configure specific radio resources (e.g., time and frequency resources) for the UE to perform the SPS/grant-free transmissions.

The UE should properly arrange that what data may be transmitted on the dynamic grant and what data may be transmitted on the configured grant. Since the configured grant should be reserved for transmitting the data with low latency requirements, the UE should avoid transmitting unnecessary data on the configured grant. Accordingly, it is important for the UE to properly skip uplink transmissions on the configured grant or the dynamic grant to avoid power wastage and reduce interference in the wireless communication system.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to uplink transmission skipping with respect to user equipment and network apparatus in mobile communications.

In one aspect, a method may involve an apparatus determining whether a padding BSR is included in a protocol data unit (PDU). The method may also involve the apparatus skipping transmission of the PDU when the padding BSR is included in the PDU. The PDU may comprise a medium access control (MAC) PDU. The MAC PDU may comprise no MAC service data unit (SDU).

In one aspect, an apparatus may comprise a transceiver capable of wirelessly communicating with a plurality of nodes of a wireless network. The apparatus may also comprise a processor communicatively coupled to the transceiver. The processor may be capable of determining whether a padding BSR is included in a PDU. The processor may also be capable of skipping transmission of the PDU when the padding BSR is included in the PDU. The PDU may comprise a MAC PDU. The MAC PDU may comprise no MAC SDU.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
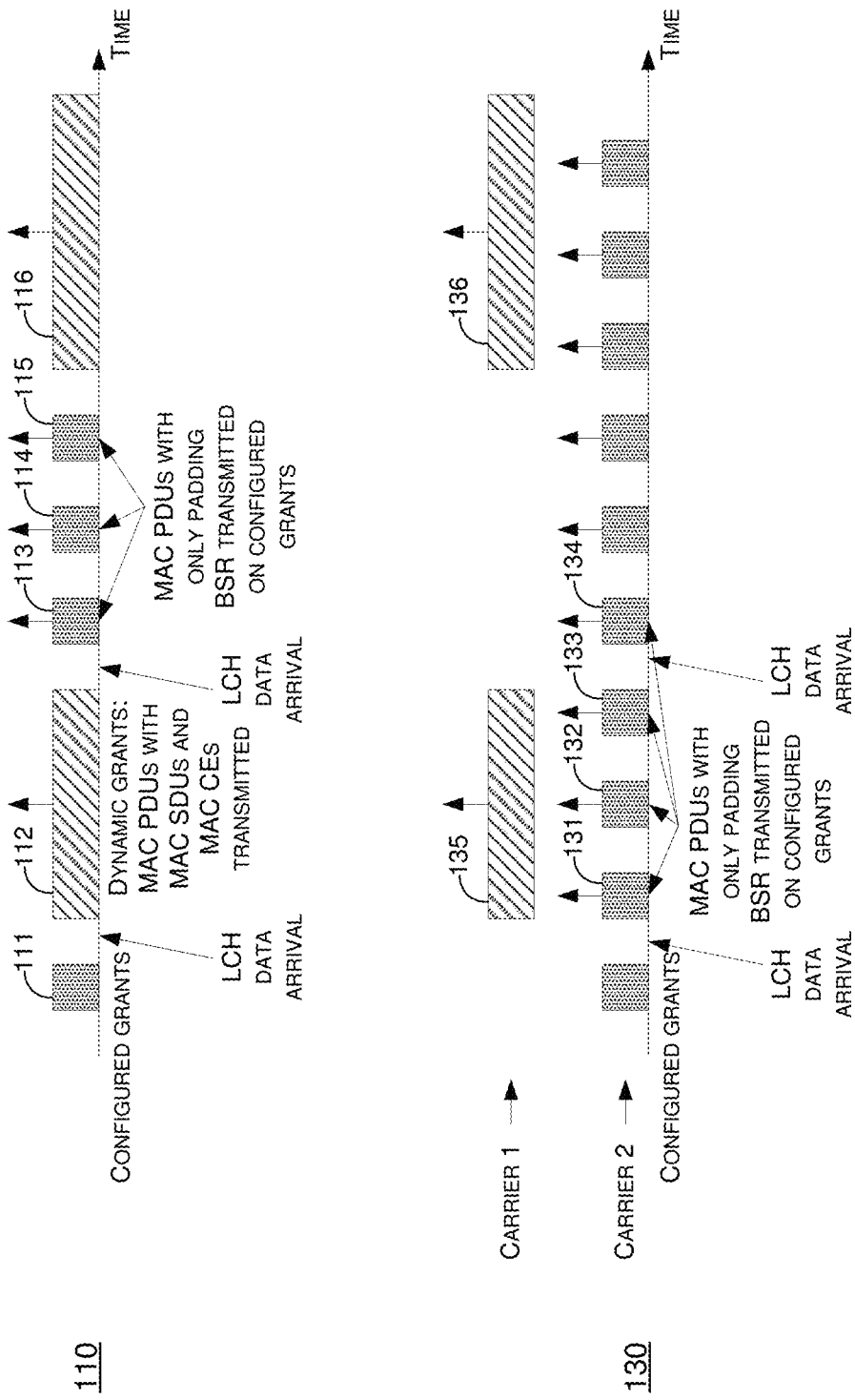
FIG. 1 is a diagram depicting example scenarios under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to uplink transmission skipping with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, the network side may configure two types of uplink grants for the UE to perform uplink transmissions. The uplink grant may indicate some specific radio resources (e.g., time and frequency resources) for the UE to perform uplink transmission. One type of the uplink grants may comprise the dynamic grant. The dynamic grant may be configured based on the UE's request. For example, the UE may transmit a prior request (e.g., SR, RACH request or BSR) to the network side. After receiving the request, the network side may configure the dynamic grant according to UE's request for the UE to perform uplink data transmission. The other type of the uplink grants may comprise the configured grant. The configured grant may be configured by the network side without UE's request. For example, the uplink grant-free transmission or transmission using configured grants is proposed to reduce the latency of URLLC services. The UE may be configured to transmit its uplink data on the configured grant without transmitting a prior request to improve the transmission latency. The network side may pre-configure specific radio resources (e.g., time and frequency resources) for the UE to perform the configured grant/grant-free transmissions.

However, the configured grant may be potentially shared by a plurality of UEs. Consequently, collisions or conflicts of the transmissions may happen among the plurality of UEs. Accordingly, in order to lower the collision rate for the contention based grant-free transmission, logical channel (LCH) restrictions may be introduced to limit the usage of the configured grant. The LCH restrictions may also be used to match the quality of service (QoS) requirements of a logical channel to appropriate grants, or may be used in duplication to ensure that the duplicated data are transmitted on different cells. The network side may configure the LCH restrictions on the logical channels of the UE. The UE may determine an allowed logical channel or a restricted logical channel according to the LCH restrictions. For example, the network side may configure that only the logical channel with low latency requirements or high priority data (e.g., allowed logical channel) may be allowed to use the configured grant. For the restricted logical channels, they may not be allowed to use the configured grant even when there may be data available on the restricted logical channels. The data available on the restricted logical channels may have to wait for the dynamic grant for transmission.

FIG. 1 illustrates example scenarios 110 and 130 under schemes in accordance with implementations of the present disclosure. Scenarios 110 and 130 involve a UE and a network apparatus, which may be a part of a wireless communication network (e.g., an LTE network, an LTE-Advanced network, an LTE-Advanced Pro network, a 5G network, an NR network, an IoT network or an NB-IoT network). In Scenario 110, the UE is connected to the network apparatus with one single carrier. The UE may comprise a plurality of logical channels including the allowed logical channels and the restricted logical channels. The UE may be configured with the configured grants 111, 113, 114 and 115 and the dynamic grants 112 and 116. The dynamic grants may be used to transmit the MAC PDUs with the MAC SDUs and the MAC control elements (CEs). For example, when the data is available or arrive on the logical channels, the MAC entity of the UE may generate the MAC PDUs with the MAC SDUs and the MAC CEs. The UE may be configured to transmit the MAC PDUs on the dynamic grants (e.g., dynamic grant 112).

Specifically, in some instances, the BSR may not be empty since the buffer status for some logical channel groups (LCGs) may be non-zero. For example, there may be data available on the restricted logical channels. However, in view of the LCH restrictions, the MAC entity of the UE may not generate any MAC SDUs for the configured grants when only the restricted logical channels have data available. The MAC entity may be configured to generate the MAC PDUs with only padding BSR to report the buffer status. The UE may be configured to transmit the MAC PDUs with only padding BSR on the configured grants (e.g., configured grants 113, 114 and 115). When there is a dynamic grant configured (e.g., dynamic grant 116), the MAC entity of the UE may be further configured to generate the MAC PDUs with the MAC SDUs and the MAC CEs and transmit the MAC PDUs on the dynamic grants.

In scenario 130, the UE is connected to the network apparatus with a plurality of carriers (e.g., carrier 1 and carrier 2) under uplink carrier aggregation (CA). The UE may comprise a plurality of logical channels including the allowed logical channels and the restricted logical channels. The UE may be configured with the configured grants 131, 132, 133 and 134 on carrier 2 and the dynamic grants 135 and 136 on carrier 1. Similarly, the dynamic grants may be used to transmit the MAC PDUs with the MAC SDUs and the MAC CEs. For example, when the data is available or arrive on the logical channels, the MAC entity of the UE may generate the MAC PDUs with the MAC SDUs and the MAC CEs. The UE may be configured to transmit the MAC PDUs on the dynamic grants of carrier 1 (e.g., dynamic grant 135 or 136).

Similarly, the configured grants on carrier 2 may be used to transmit the data on the allowed logical channels. Specifically, in some instances, the BSR may not be empty since the buffer status for some LCGs may be non-zero. For example, there may be data available on the restricted logical channels. However, in view of the LCH restrictions, the MAC entity of the UE may not generate any MAC SDUs for the configured grants when only the restricted logical channels have data available. The MAC entity may be configured to generate the MAC PDUs with only padding BSR to report the buffer status. The UE may be configured to transmit the MAC PDUs with only padding BSR on the configured grants of carrier 2 (e.g., configured grants 131, 132, 133 and 134).

In accordance with scenarios 110 and 130, whenever there is data available on the restricted LCHs, the UE may always transmit the MAC PDU with only the padding BSR on the configured grants. However, transmitting too many MAC PDUs that include only the padding BSRs may cause power wastage of the UE and may increase the amount of interferences in the wireless communication system. It may be needed to properly skip the uplink transmissions.

Figure 2:
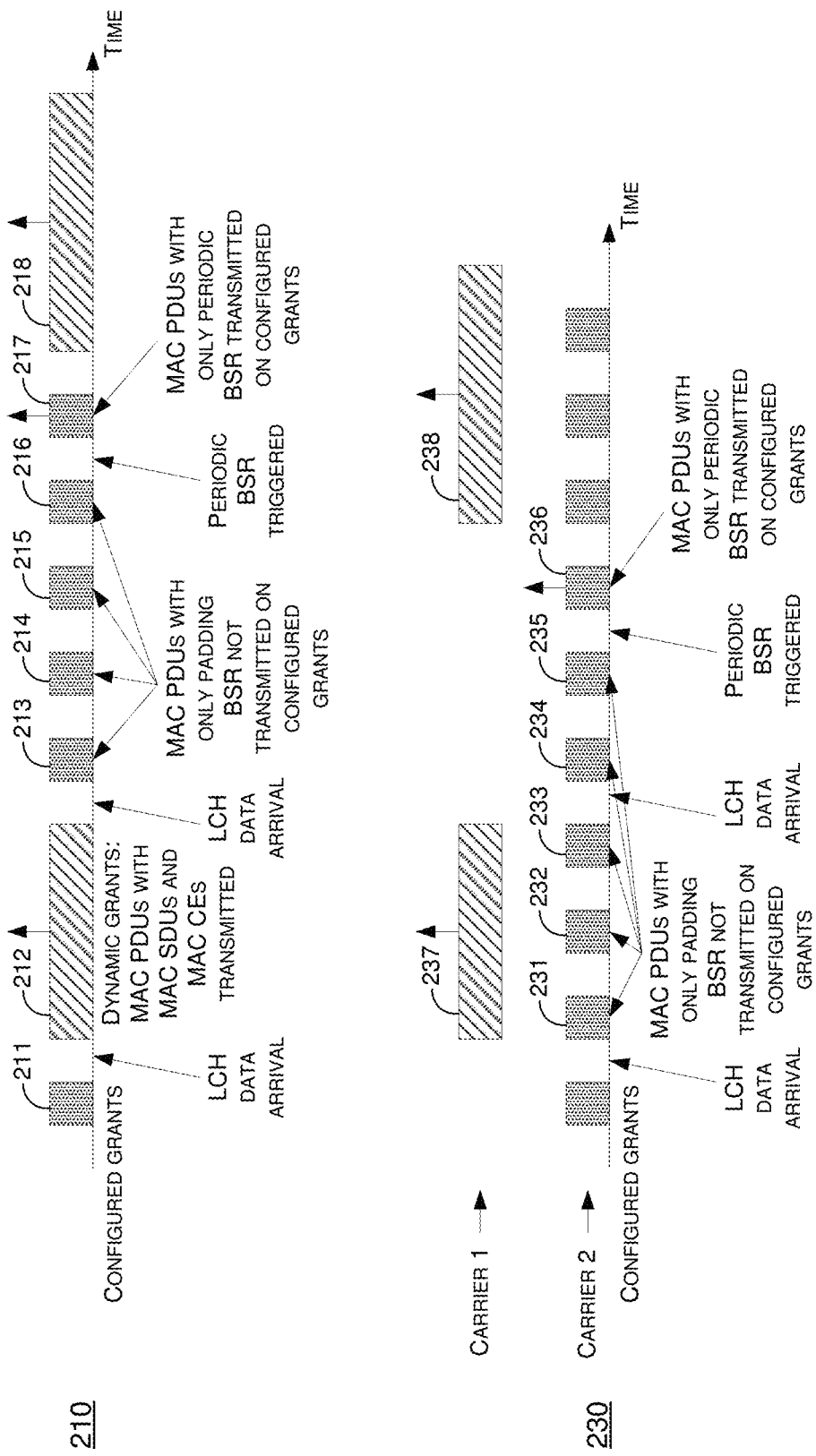
FIG. 2 is a diagram depicting example scenarios under schemes in accordance with implementations of the present disclosure.

FIG. 2 illustrates example scenarios 210 and 230 under schemes in accordance with implementations of the present disclosure. Scenarios 210 and 230 involve a UE and a network apparatus, which may be a part of a wireless communication network (e.g., an LTE network, an LTE-Advanced network, an LTE-Advanced Pro network, a 5G network, an NR network, an IoT network or an NB-IoT network). In Scenario 210, the UE is connected to the network apparatus with one single carrier. The UE may comprise a plurality of logical channels including the allowed logical channels and the restricted logical channels. The UE may be configured with the configured grants 211, 213, 214, 215, 216 and 217 and the dynamic grants 212 and 216. The dynamic grants may be used to transmit the MAC PDUs with the MAC SDUs and the MAC CEs. For example, when the data is available or arrive on the logical channels, the MAC entity of the UE may generate the MAC PDUs with the MAC SDUs and the MAC CEs. The UE may be configured to transmit the MAC PDUs on the dynamic grants (e.g., dynamic grant 212).

However, in order to reduce unnecessary uplink transmissions, the UE may be configured not to generate a PDU (e.g., MAC PDU) in an event that at least one pre-determined condition is satisfied. The pre-determined condition may comprise whether the MAC entity of the UE is configured with the uplink transmission skipping. The UE may receive a configuration to enable the uplink transmission skipping via a radio resource control (RRC) signaling or a layer 1 (L1) signaling. The uplink transmission skipping may be applied to the configured grant or the dynamic grant. The pre-determined condition may also comprise whether the uplink grant indicated to the UE is a configured grant. The pre-determined condition may further comprise whether a PDU (e.g., MAC PDU) includes zero SDU (e.g., MAC SDU). The pre-determined condition may further comprise whether the PDU (e.g., MAC PDU) includes only the padding BSR.

Specifically, assuming that the UE is configured with the uplink transmission skipping and the uplink grant indicated to the UE is a configured grant. In some instances, the BSR may not be empty since the buffer status for some LCGs may be non-zero. For example, there may be data available on the restricted logical channels. The MAC entity of the UE may not generate any MAC SDUs for the configured grants when only the restricted logical channels have data available. The UE may be configured to determine whether a padding BSR is included in a PDU (e.g., MAC PDU). The UE may be configured to skip transmission of the PDU when the padding BSR is included in the PDU. In other words, the UE may be configured not to transmit the PDU including only the padding BSR on the configured grants (e.g., configured grants 213, 214, 215 and 216). The UE may be configured not to generate a MAC PDU when the MAC PDU includes only the padding BSR and zero MAC SDU.

The pre-determined condition may further comprise whether a PDU (e.g., MAC PDU) includes only a periodic BSR and there is no data available for any LCG. Specifically, the UE may be configured to determine whether a periodic BSR is included in a PDU (e.g., MAC PDU). The periodic BSR may be triggered with pre-determined periodicity. The periodicity may be configured by the network apparatus via a RRC signaling. The UE may also be configured to determine whether there is data available in a logical channel. The UE may further be configured to skip transmission of the PDU when the periodic BSR is included in the PDU and no data is available in the logical channel. In other words, the UE may be configured not to transmit the PDU including only the periodic BSR and there is no data available in any logical channel when the uplink skipping is configured. The UE may be configured not to generate a MAC PDU when the MAC PDU includes only the periodic BSR and zero MAC SDU and there is no data available in any logical channel.

Alternatively, the UE may be configured to determine whether a periodic BSR is included in a PDU (e.g., MAC PDU). The UE may also be configured to determine whether there is data available in a logical channel. The UE may further be configured to transmit the PDU when the periodic BSR is included in the PDU and there is data available in the logical channel. In other words, the UE may be configured to generate a MAC PDU when the MAC PDU includes the periodic BSR and there is data available in any logical channel. The UE may be configured to transmit the MAC PDU with only periodic BSR on the configured grant (e.g., configured grant 217).

In scenario 230, the UE is connected to the network apparatus with a plurality of carriers (e.g., carrier 1 and carrier 2) under uplink carrier aggregation (CA). The UE may comprise a plurality of logical channels including the allowed logical channels and the restricted logical channels. The UE may be configured with the configured grants 231, 232, 233, 234, 235 and 236 on carrier 2 and the dynamic grants 237 and 238 on carrier 1. Similarly, the dynamic grants may be used to transmit the MAC PDUs with the MAC SDUs and the MAC CEs. For example, when the data is available or arrive on the logical channels, the MAC entity of the UE may generate the MAC PDUs with the MAC SDUs and the MAC CEs. The UE may be configured to transmit the MAC PDUs on the dynamic grants of carrier 1 (e.g., dynamic grant 237 and 238).

Similarly, assuming that the UE is configured with the uplink transmission skipping and the uplink grant indicated to the UE is a configured grant. In some instances, the BSR may not be empty since the buffer status for some LCGs may be non-zero. For example, there may be data available on the restricted logical channels. The MAC entity of the UE may not generate any MAC SDUs for the configured grants when only the restricted logical channels have data available. The UE may be configured to determine whether a padding BSR is included in a PDU (e.g., MAC PDU). The UE may be configured to skip transmission of the PDU when the padding BSR is included in the PDU. In other words, the UE may be configured not to transmit the PDU including only the padding BSR on the configured grants of carrier 2 (e.g., configured grants 231, 232, 233, 234 and 235). The UE may be configured not to generate a MAC PDU when the MAC PDU includes only the padding BSR and zero MAC SDU.

Similarly, the pre-determined condition may further comprise whether a PDU (e.g., MAC PDU) includes only a periodic BSR and there is no data available for any LCG. Specifically, the UE may be configured to determine whether a periodic BSR is included in a PDU (e.g., MAC PDU). The periodic BSR may be triggered with pre-determined periodicity. The periodicity may be configured by the network apparatus via a RRC signaling. The UE may also be configured to determine whether there is data available in a logical channel. The UE may further be configured to skip transmission of the PDU when the periodic BSR is included in the PDU and no data is available in the logical channel. In other words, the UE may be configured not to transmit the PDU including only the periodic BSR and there is no data available in any logical channel on the configured grants of carrier 2. The UE may be configured not to generate a MAC PDU when the MAC PDU includes only the periodic BSR and zero MAC SDU and there is no data available in any logical channel.

Similarly, the UE may be configured to determine whether a periodic BSR is included in a PDU (e.g., MAC PDU). The UE may also be configured to determine whether there is data available in a logical channel. The UE may further be configured to transmit the PDU when the periodic BSR is included in the PDU and there is data available in the logical channel. In other words, the UE may be configured to generate a MAC PDU when the MAC PDU includes the periodic BSR and there is data available in any logical channel. The UE may be configured to transmit the MAC PDU with only periodic BSR on the configured grant of carrier 2 (e.g., configured grant 236).

Illustrative Implementations

Figure 3:
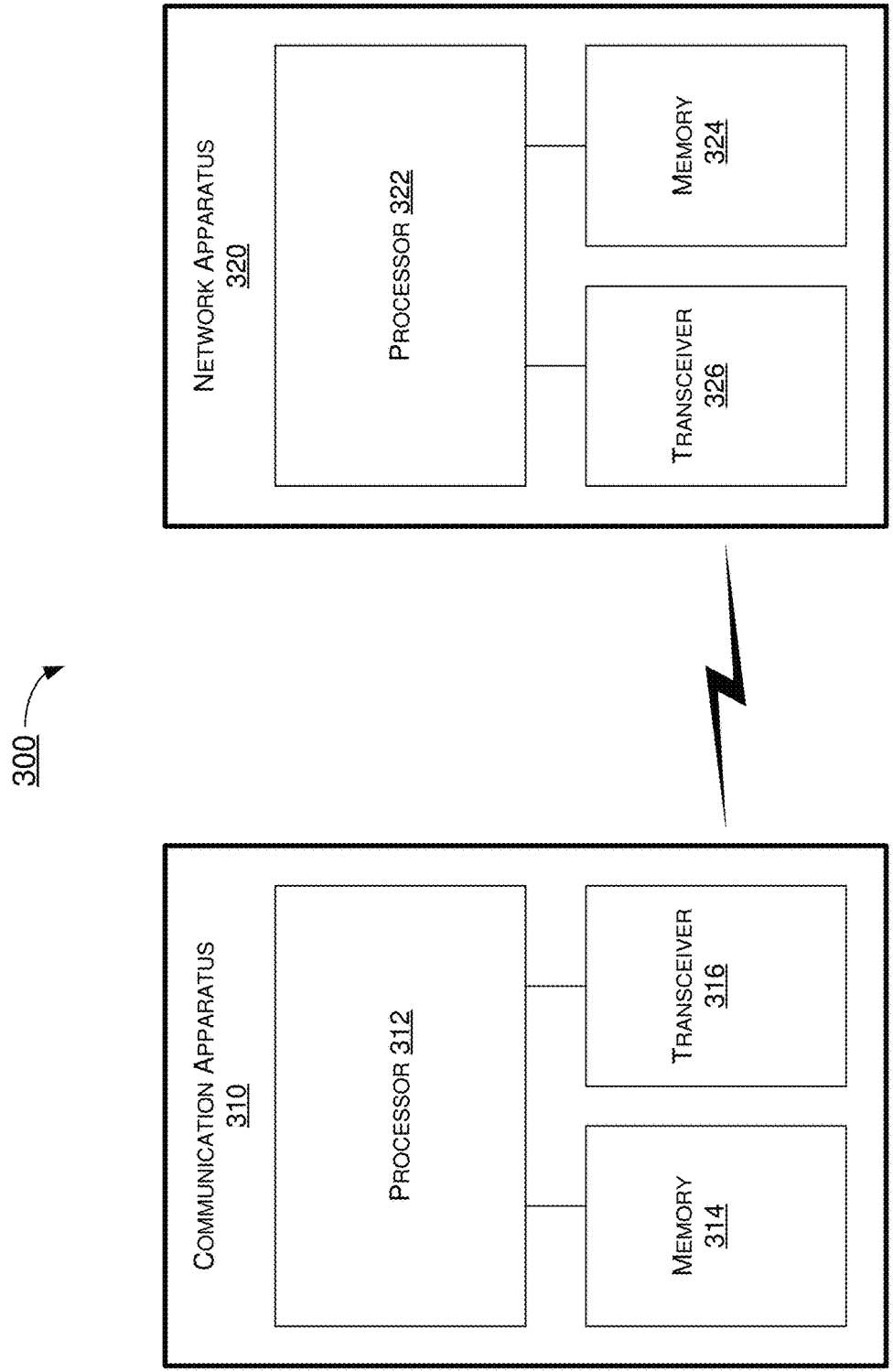
FIG. 3 is a block diagram of an example communication apparatus and an example network apparatus in accordance with an implementation of the present disclosure.

FIG. 3 illustrates an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to uplink transmission skipping with respect to user equipment and network apparatus in wireless communications, including scenarios 110, 130, 210 and 230 described above as well as process 400 described below.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT or NB-IoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 310 may include at least some of those components shown in FIG. 3 such as a processor 312, for example, communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in an LTE, LTE-Advanced or LTE-Advanced Pro network or in a gNB in a 5G, NR, IoT or NB-IoT network. Alternatively, network apparatus 320 may be implemented in the form of one or more IC chips such as, for example and without limitation, one or more single-core processors, one or more multi-core processors, or one or more RISC or CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including power consumption reduction in a device (e.g., as represented by communication apparatus 310) and a network (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

In some implementations, processor 312 may be configured to connect to, via transceiver 316, network apparatus 320 with one single carrier. Processor 312 may comprise a plurality of logical channels including the allowed logical channels and the restricted logical channels. Processor 312 may be configured with the configured grants and the dynamic grants by network apparatus 320. Processor 312 may use the dynamic grants to transmit the MAC PDUs with the MAC SDUs and the MAC CEs. For example, when the data is available or arrive on the logical channels, processor 312 may generate the MAC PDUs with the MAC SDUs and the MAC CEs. Processor 312 may be configured to transmit the MAC PDUs on the dynamic grants.

In some implementations, processor 312 may be configured not to generate a PDU (e.g., MAC PDU) in an event that at least one pre-determined condition is determined. Processor 312 may be configured to determine whether uplink transmission skipping is configured. Processor 312 may receive a configuration, via transceiver 316, to enable the uplink transmission skipping via a RRC signaling or a L1 signaling. Processor 312 may be configured to determine whether the indicated uplink grant is a configured grant. Processor 312 may be configured to determine whether a PDU (e.g., MAC PDU) includes zero SDU (e.g., MAC SDU). Processor 312 may be configured to determine whether the PDU (e.g., MAC PDU) includes only the padding BSR.

In some implementations, processor 312 may determine that the uplink transmission skipping is configured and the indicated uplink grant is a configured grant. In some instances, the BSR may not be empty since the buffer status for some LCGs may be non-zero. For example, there may be data available on the restricted logical channels. Processor 312 may not generate any MAC SDUs for the configured grants when only the restricted logical channels have data available. Processor 312 may be configured to determine whether a padding BSR is included in a PDU (e.g., MAC PDU). Processor 312 may be configured to skip transmission of the PDU when the padding BSR is included in the PDU. In other words, processor 312 may be configured not to transmit the PDU including only the padding BSR on the configured grants. Processor 312 may be configured not to generate a MAC PDU when the MAC PDU includes only the padding BSR and zero MAC SDU.

In some implementations, processor 312 may further be configured to determine whether a PDU (e.g., MAC PDU) includes only a periodic BSR and there is no data available for any LCG. Specifically, processor 312 may be configured to determine whether a periodic BSR is included in a PDU (e.g., MAC PDU). The periodic BSR may be triggered with pre-determined periodicity. The periodicity may be configured by network apparatus 320 via a RRC signaling. Processor 312 may also be configured to determine whether there is data available in a logical channel. Processor 312 may further be configured to skip transmission of the PDU when the periodic BSR is included in the PDU and no data is available in the logical channel. In other words, processor 312 may be configured not to transmit the PDU including only the periodic BSR and there is no data available in any logical channel on the configured grants. Processor 312 may be configured not to generate a MAC PDU when the MAC PDU includes only the periodic BSR and zero MAC SDU and there is no data available in any logical channel.

In some implementations, processor 312 may be configured to determine whether a periodic BSR is included in a PDU (e.g., MAC PDU). Processor 312 may also be configured to determine whether there is data available in a logical channel. Processor 312 may further be configured to transmit the PDU when the periodic BSR is included in the PDU and there is data available in the logical channel. In other words, processor 312 may be configured to generate a MAC PDU when the MAC PDU includes the periodic BSR and there is data available in any logical channel. Processor 312 may be configured to transmit the MAC PDU with only periodic BSR on the configured grant.

In some implementations, processor 312 is connected, via transceiver 316, to network apparatus 320 with a plurality of carriers (e.g., a first carrier and a second carrier) under uplink carrier aggregation (CA). Processor 312 may comprise a plurality of logical channels including the allowed logical channels and the restricted logical channels. Processor 312 may be configured with the configured grants on the second carrier and the dynamic grants on the first carrier. Processor 312 may use the dynamic grants to transmit the MAC PDUs with the MAC SDUs and the MAC CEs. For example, when the data is available or arrive on the logical channels, processor 312 may generate the MAC PDUs with the MAC SDUs and the MAC CEs. Processor 312 may be configured to transmit the MAC PDUs on the dynamic grants of the first carrier.

In some implementations, processor 312 may be configured with the uplink transmission skipping and the indicated uplink grant may be a configured grant. In some instances, the BSR may not be empty since the buffer status for some LCGs may be non-zero. For example, there may be data available on the restricted logical channels. Processor 312 may not generate any MAC SDUs for the configured grants when only the restricted logical channels have data available. Processor 312 may be configured to determine whether a padding BSR is included in a PDU (e.g., MAC PDU). Processor 312 may be configured to skip transmission of the PDU when the padding BSR is included in the PDU. In other words, processor 312 may be configured not to transmit the PDU including only the padding BSR on the configured grants of the second carrier. Processor 312 may be configured not to generate a MAC PDU when the MAC PDU includes only the padding BSR and zero MAC SDU.

In some implementations, processor 312 may determine whether a PDU (e.g., MAC PDU) includes only a periodic BSR and there is no data available for any LCG. Specifically, processor 312 may be configured to determine whether a periodic BSR is included in a PDU (e.g., MAC PDU). The periodic BSR may be triggered with pre-determined periodicity. The periodicity may be configured by network apparatus 320 via a RRC signaling. Processor 312 may also be configured to determine whether there is data available in a logical channel. Processor 312 may further be configured to skip transmission of the PDU when the periodic BSR is included in the PDU and no data is available in the logical channel. In other words, processor 312 may be configured not to transmit the PDU including only the periodic BSR and there is no data available in any logical channel on the configured grants of the second carrier. Processor 312 may be configured not to generate a MAC PDU when the MAC PDU includes only the periodic BSR and zero MAC SDU and there is no data available in any logical channel.

In some implementations, processor 312 may be configured to determine whether a periodic BSR is included in a PDU (e.g., MAC PDU). Processor 312 may also be configured to determine whether there is data available in a logical channel. Processor 312 may further be configured to transmit the PDU when the periodic BSR is included in the PDU and there is data available in the logical channel. In other words, processor 312 may be configured to generate a MAC PDU when the MAC PDU includes the periodic BSR and there is data available in any logical channel. Processor 312 may be configured to transmit the MAC PDU with only periodic BSR on the configured grant of the second carrier.

Illustrative Processes

Figure 4:
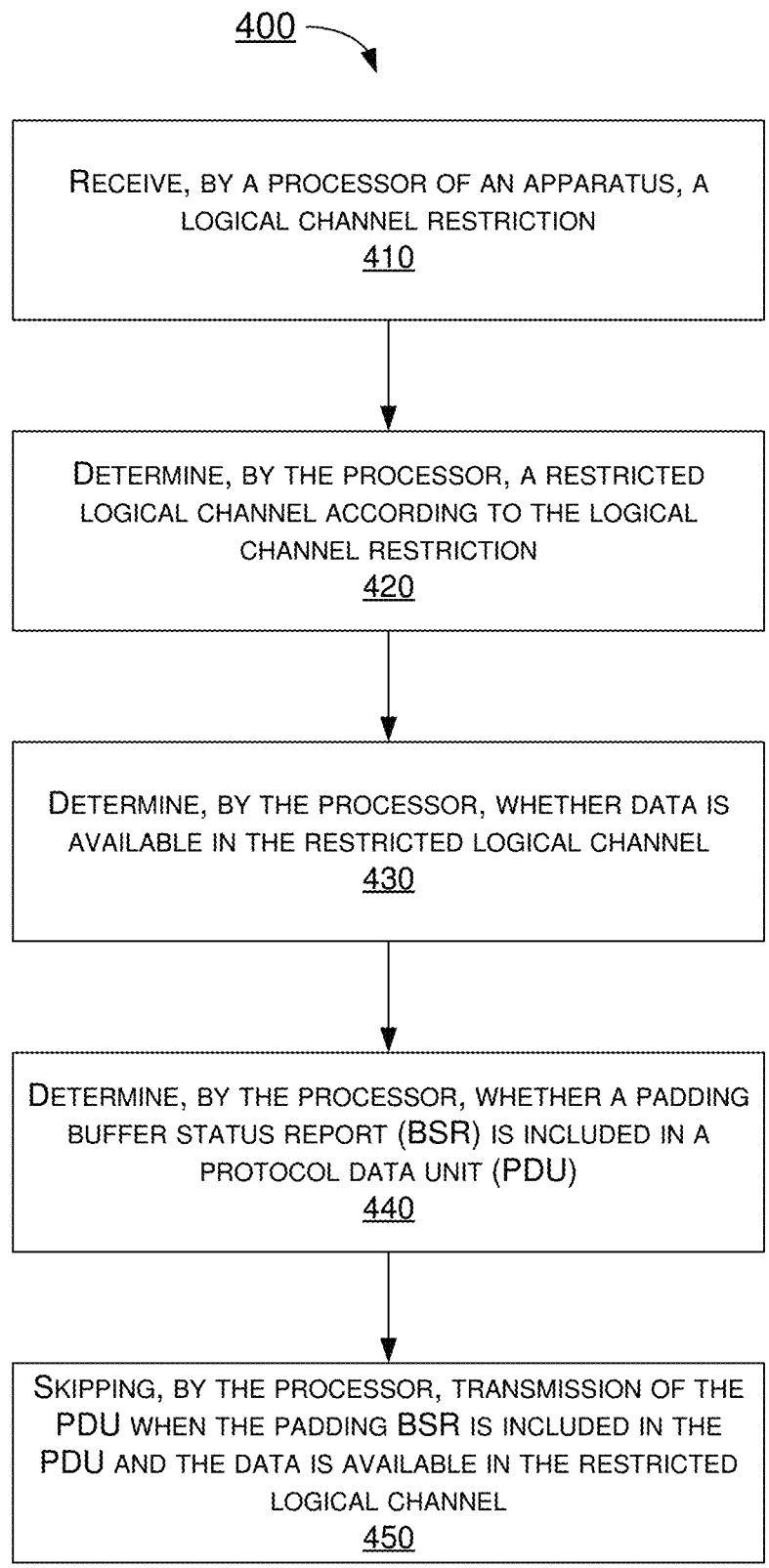
FIG. 4 is a flowchart of an example process in accordance with an implementation of the present disclosure.

FIG. 4 illustrates an example process 400 in accordance with an implementation of the present disclosure. Process 400 may be an example implementation of scenarios 210 and 230, whether partially or completely, with respect to uplink transmission skipping in accordance with the present disclosure. Process 400 may represent an aspect of implementation of features of communication apparatus 310. Process 400 may include one or more operations, actions, or functions as illustrated by one or more of blocks 410, 420, 430, 440 and 450. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At 410, process 400 may involve processor 312 of apparatus 310 receiving a logical channel restriction. Process 400 may proceed from 410 to 420.

At 420, process 400 may involve processor 312 determining a restricted logical channel according to the logical channel restriction. Process 400 may proceed from 420 to 430.

At 430, process 400 may involve processor 312 determining whether data is available in the restricted logical channel. Process 400 may proceed from 430 to 440.

At 440, process 400 may involve processor 312 determining whether a padding BSR is included in a first PDU. Process 400 may proceed from 440 to 450.

At 450, process 400 may involve processor 312 skipping transmission of the first PDU when the padding BSR is included in the first PDU and the data is available in the restricted logical channel.

In some implementations, the first PDU may comprise a MAC PDU. The MAC PDU may comprise no MAC SDU.

In some implementations, process 400 may involve processor 312 receiving a configured grant. Process 400 may involve processor 312 skipping transmission of the first PDU on the configured grant.

In some implementations, process 400 may involve processor 312 determining whether a periodic BSR is included in a second PDU. Process 400 may involve processor 312 determining whether data is available in a logical channel. Process 400 may involve processor 312 skipping transmission of the second PDU when the periodic BSR is included in the second PDU and no data is available in the logical channel.

In some implementations, process 400 may involve processor 312 determining whether a periodic BSR is included in a second PDU. Process 400 may involve processor 312 determining whether data is available in a logical channel. Process 400 may involve processor 312 transmitting the second PDU when the periodic BSR is included in the second PDU and the data is available in the logical channel. The second PDU may comprise solely the periodic BSR.

In some implementations, process 400 may involve processor 312 receiving a configured grant. Process 400 may involve processor 312 transmitting the second PDU on the configured grant.

In some implementations, process 400 may involve processor 312 skipping transmission of the first PDU when no data is included in the first PDU.

In some implementations, process 400 may involve processor 312 receiving a configuration to enable uplink transmission skipping. The configuration may be received via a radio resource control (RRC) signaling or a layer 1 (L1) signaling.

In some implementations, process 400 may involve processor 312 not generating the first PDU for skipping transmission of the first PDU.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a processor of an apparatus, whether a periodic BSR is included in a PDU;
   determining, by the processor, whether data is available for a logical channel group (LCG); and
   skipping, by the processor, transmission of the PDU when the periodic BSR is included in the PDU and no data is available for the LCG.

2. The method of claim 1, wherein the PDU comprises a medium access control (MAC) PDU, and wherein the MAC PDU comprises no MAC service data unit (SDU).

3. The method of claim 1, further comprising:
   receiving, by the processor, a configured grant; and
   skipping, by the processor, transmission of the PDU on the configured grant.

4. The method of claim 1, further comprising:
   transmitting, by the processor, the PDU when the periodic BSR is included in the PDU and the data is available for the LCG,
   wherein the PDU comprises solely the periodic BSR.

5. The method of claim 4, further comprising:
   receiving, by the processor, a configured grant; and
   transmitting, by the processor, the PDU on the configured grant.

6. The method of claim 1, further comprising:
   receiving, by the processor, a logical channel restriction;
   determining, by the processor, a restricted logical channel according to the logical channel restriction;
   determining, by the processor, that data is available in the restricted logical channel; and
   skipping, by the processor, transmission of the PDU when no data is included in the PDU.

7. The method of claim 1, further comprising:
   receiving, by the processor, a configuration to enable uplink transmission skipping.

8. The method of claim 7, wherein the configuration is received via a radio resource control (RRC) signaling or a layer 1 (L1) signaling.

9. The method of claim 1, wherein the skipping comprises not generating the PDU.

10. An apparatus, comprising:
    a transceiver capable of wirelessly communicating with a plurality of nodes of a wireless network; and
    a processor communicatively coupled to the transceiver, the processor capable of:
    determining whether a periodic BSR is included in a PDU;
    determining whether data is available for a logical channel group (LCG); and
    skipping transmission of the PDU when the periodic BSR is included in the PDU and no data is available for the LCG.

11. The apparatus of claim 10, wherein the PDU comprises a medium access control (MAC) PDU, and wherein the MAC PDU comprises no MAC service data unit (SDU).

12. The apparatus of claim 10, wherein the processor is further capable of:
    receiving, via the transceiver, a configured grant; and
    skipping transmission of the PDU on the configured grant.

13. The apparatus of claim 10, wherein the processor is further capable of:
    transmitting, via the transceiver, the PDU when the periodic BSR is included in the second PDU and the data is available for the LCG,
    wherein the PDU comprises solely the periodic BSR.

14. The apparatus of claim 13, wherein the processor is further capable of:
    receiving, via the transceiver, a configured grant; and
    transmitting, via the transceiver, the PDU on the configured grant.

15. The apparatus of claim 10, wherein the processor is further capable of:
    receiving, via the transceiver, a logical channel restriction;
    determining a restricted logical channel according to the logical channel restriction;
    determining that data is available in the restricted logical channel; and
    skipping transmission of the PDU when no data is included in the PDU.

16. The apparatus of claim 10, wherein the processor is further capable of:
    receiving, via the transceiver, a configuration to enable uplink transmission skipping.

17. The apparatus of claim 16, wherein the configuration is received via a radio resource control (RRC) signaling or a layer 1 (L1) signaling.

18. The apparatus of claim 10, wherein, in skipping transmission of the PDU, the processor is capable of not generating the PDU.

* * * * *